United States Patent [19]
Arnold

[11] 3,870,129
[45] Mar. 11, 1975

[54] LOAD BRAKE

[76] Inventor: Carter H. Arnold, 317 Rocky Point Rd., Palos Verdes Estates, Calif. 90274

[22] Filed: Mar. 20, 1972

[21] Appl. No.: 236,086

[52] U.S. Cl. .............................................. 188/134
[51] Int. Cl. ............................................. B60t 7/12
[58] Field of Search ........ 188/134, 135; 192/7, 8 A, 192/8 R

[56] References Cited
UNITED STATES PATENTS
2,783,861  3/1957  Jungles ........................... 188/134 X
3,596,740  8/1971  Nau ................................... 188/134

Primary Examiner—Duane A. Reger

[57] ABSTRACT

A brake for use with a shaft rotatably driven for raising a load and for automatically braking rotation of the shaft when the driving means is stopped or fails. Relatively shiftable camming members are employed to apply a frictional braking force against yieldable resistance and means is provided for creating a braking force that is not directly proportional to the amount of the load involved. In one form of the invention, a plurality of pairs of camming surfaces are provided; one pair cooperating to apply the braking force when the load is relatively light and an additional pair or pairs of camming surfaces are provided to resist heavier loads. By this structure, light loads are adequately held by a brake that is, of necessity, designed for relatively heavy loads. In addition, the instant load brake permits the brake to be easily released when the load is lowered without requiring excessive torque to effect such release thereby eliminating brake chatter and reducing wear and heat. The brake shoes of the load brake are urged against the opposite outwardly facing surfaces of a pair of brake plates which in turn are yieldably urged outwardly toward the brake shoes. In the preferred form of the invention, a cam follower is provided which cooperates with a camming surface which is formed to a progressively increasing slope as the angular displacement between the camming members increases, thus insuring easy release of the brake as well as adequate braking of the load regardless of the magnitude of the latter. An automatic adjustment device is also provided which insures that wear within the brake will be compensated for without affecting the behavior of the brake.

29 Claims, 26 Drawing Figures

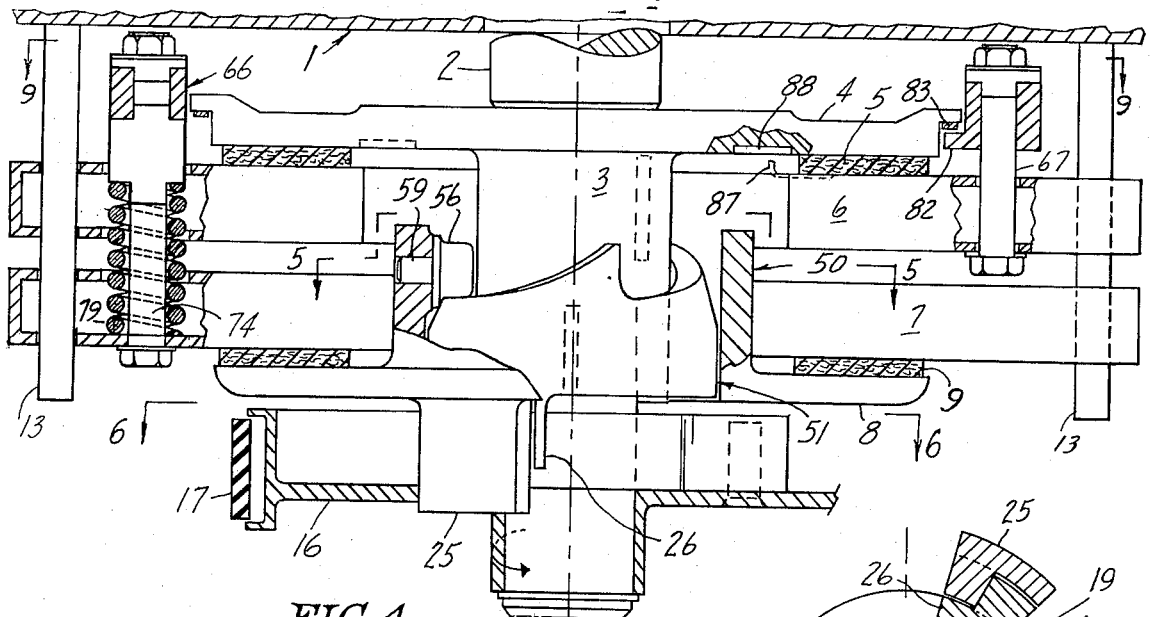
FIG. 4
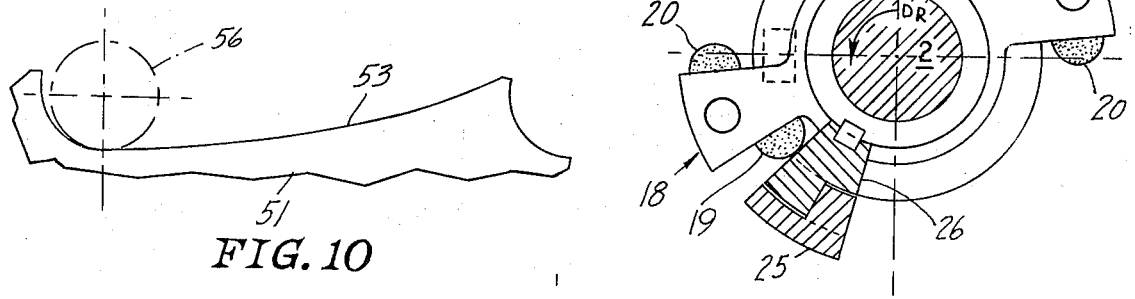
FIG. 10
FIG. 6
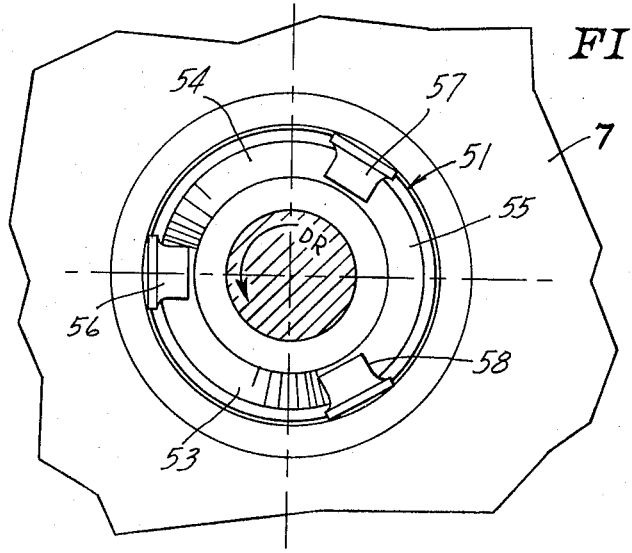
FIG. 5

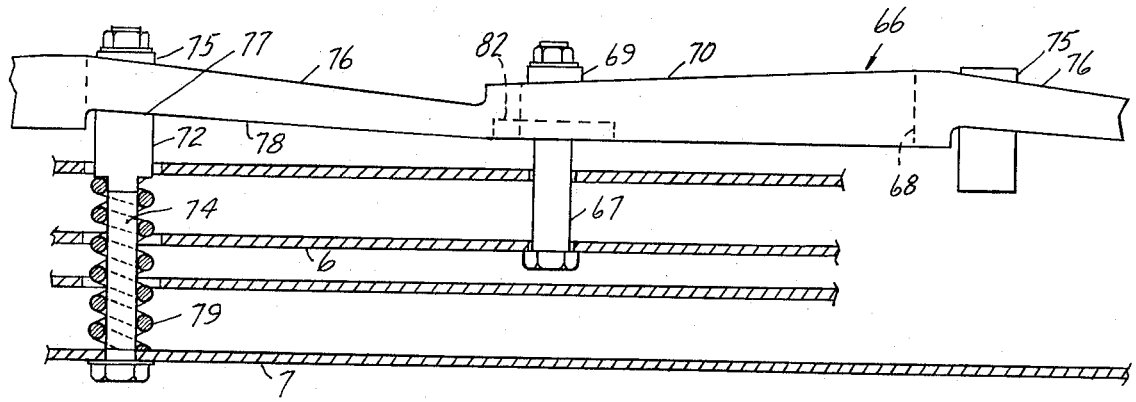
FIG. 7
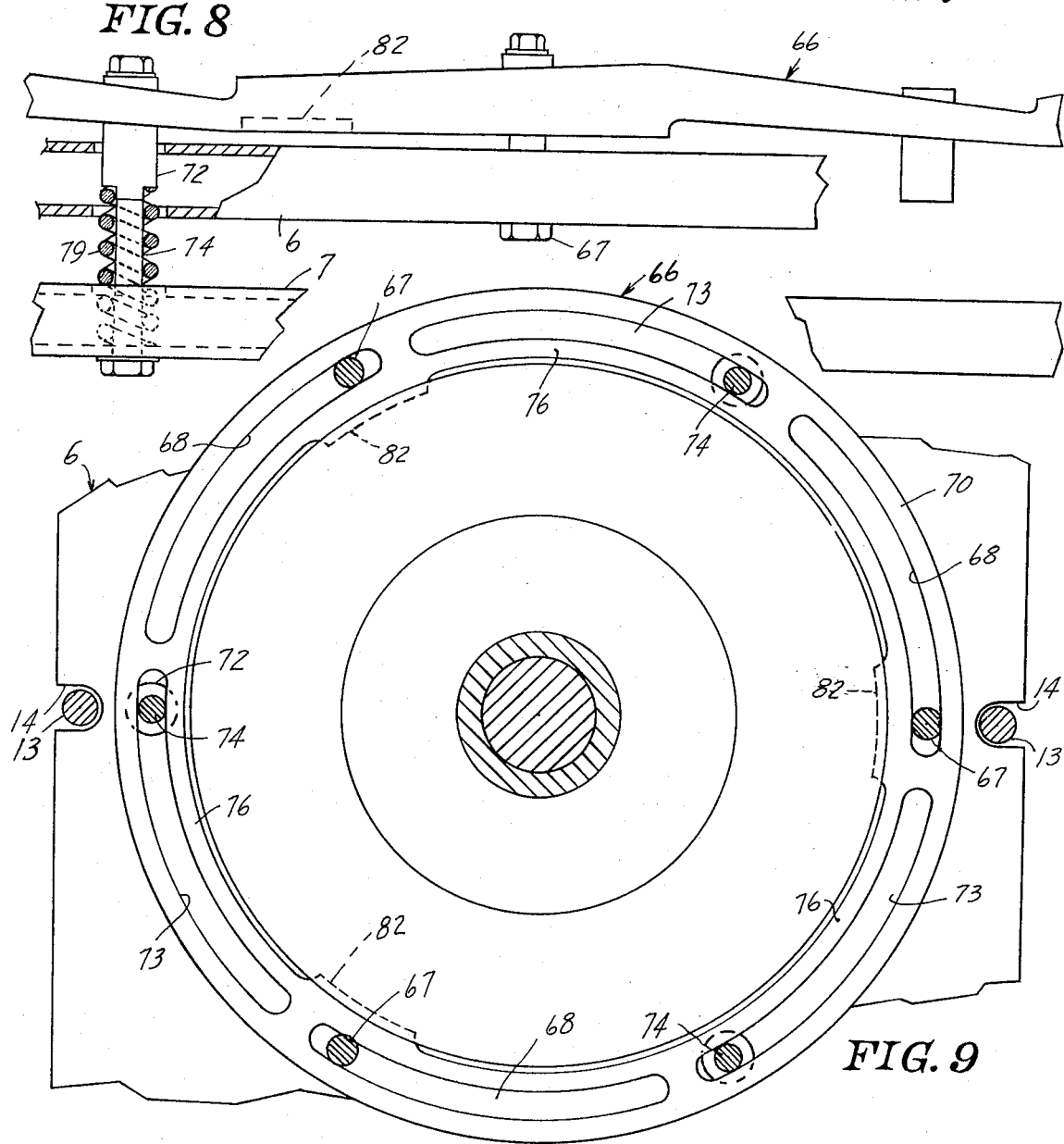
FIG. 8
FIG. 9

3,870,129

FIG. 12C
FIG. 12D
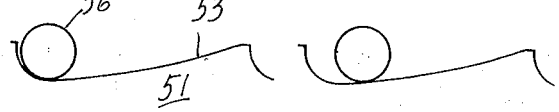
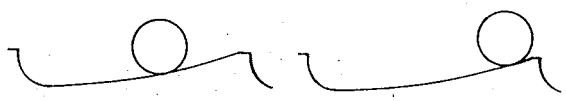

FIG. 13C
FIG. 13D
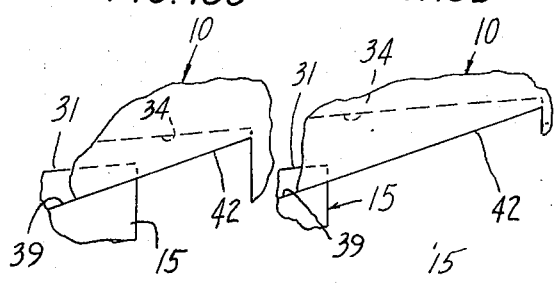
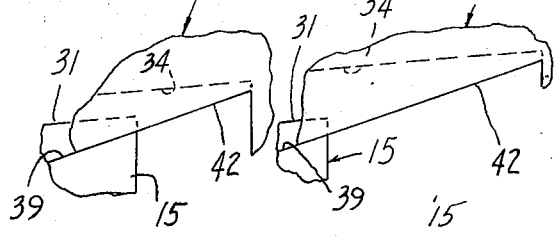
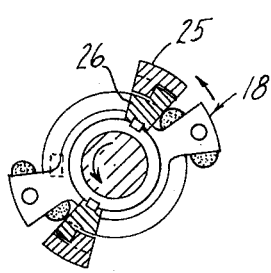
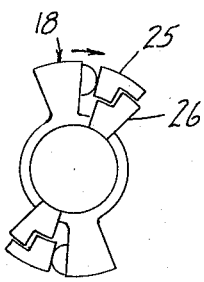
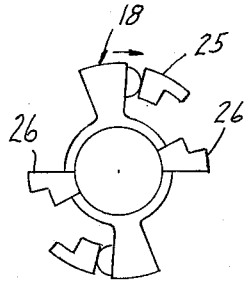
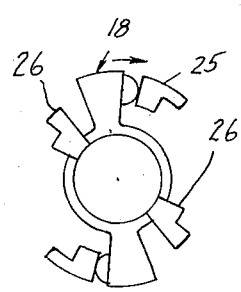
FIG. 14A  FIG. 14B  FIG. 14C  FIG. 14D

LOAD BRAKE

This invention relates to a load brake of the type employed when a shaft is rotatably driven against a load in a hoisting direction and it is desired to automatically brake the shaft when the driving means is stopped or fails. A brake of the general type herein contemplated is disclosed in my U.S. Pat. No. 3,536,169 dated Oct. 27, 1970. The present invention is an improvement on said patented structure.

Load brakes of the subject type have generally provided means for effecting axial movement of one or more brake shoe members against a nonyieldable braking plate when the power input to a shaft being driven against a load is removed. Such prior devices have generally included camming surfaces which, upon relative rotation of the same, result in an axial movement which effects the desired braking action. If the camming surfaces are designed to hold the maximum design load, difficulty has heretofore been encountered in holding relatively light loads that are considerably less than the design load. On the other hand, if the camming surfaces are designed to hold a relatively light load, then the load imposed on the camming surfaces by a heavy load creates so much static friction that it is difficult to release the camming surfaces when it is desired to reverse the direction of the shaft, thereby causing excessive heat when lowering. Furthermore, when release is effected, excessive chattering and vibration usually result. The main object of the present invention is therefore the provision of the load brake which overcomes the above noted disadvantages of prior art devices of similar nature.

Another object of the invention is the provision of a brake incorporating resiliency in the brake assembly so as to eliminate chatter by preventing camming surfaces from locking up and to permit the formation of a brake that is universal in the sense that it is adapted to hold both light and heavy loads.

Still another object of the invention is the provision of a load brake which automatically adjusts itself for wear thereby maintaining its original design characteristics.

Yet another object of the invention is the provision of a load brake which is adapted to give an audible signal in the event the wear in the brake shoes becomes excessive, thus indicating to the operator that the said brake shoes should be replaced.

Other objects and advantages of the invention will be apparent from the following specification and from the drawings.

FIG. 4 is a view similar to FIG. 2 showing the preferred form of the invention.

FIG. 5 is a transverse sectional view taken in a plane indicated by lines 5—5 of FIG. 4 and showing the cooperation between the camming members.

FIG. 6 is a cross sectional view taken in a plane indicated by lines 6—6 of FIG. 4 and showing the driving means.

FIG. 7 is a plan view development of a portion of the wear compensation cam showing its cooperation with the camming plates.

FIG. 8 is a view similar to FIG. 7 showing the arrangement of the parts after the brake shoes have undergone some wear.

FIG. 9 is a cross sectional view through the shaft showing the cooperation of the wear compensation cam and the brake plates.

FIG. 10 is a schematic development of one of the camming surfaces in the structure of FIG. 4.

FIGS. 11—14 are schematics relating the behavior of the brake to various positions of the cam members.

Figure 1:
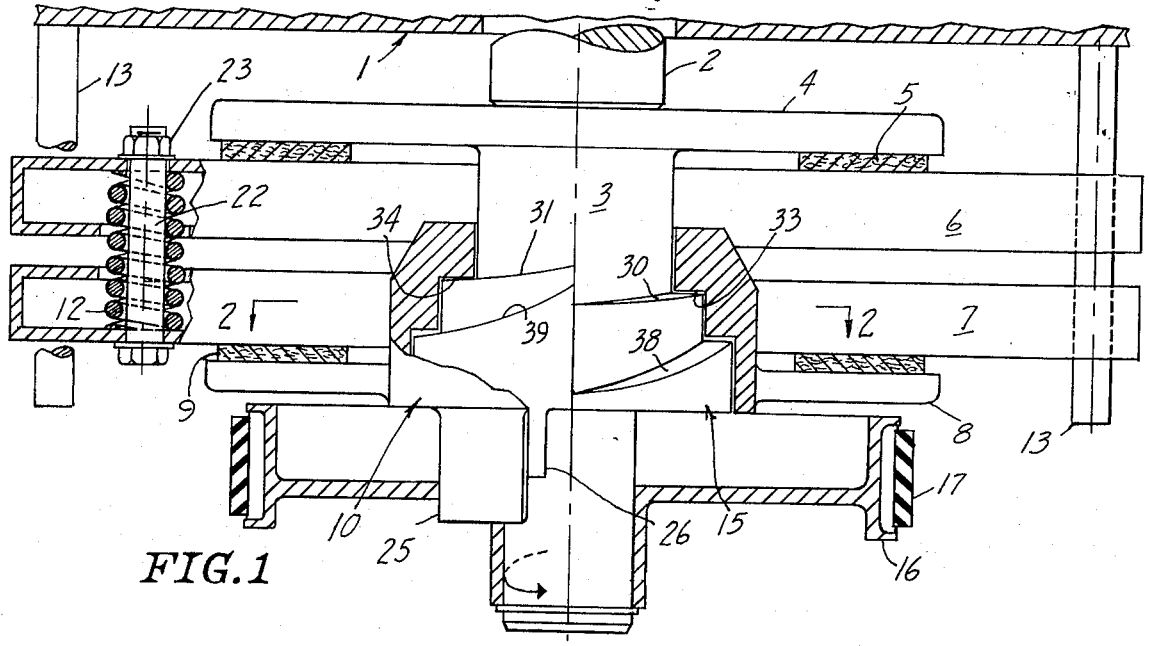
FIG. 1 is a plan view partly in section of a driving shaft connected to a load and showing one form of the present invention.

In detail, and first with reference to FIG. 1, the invention is adapted to be employed on a device having a housing generally designated 1, which may take any form depending on the particular type of unit which the invention is employed in. Rotatably supported in the housing 1 is a shaft 2, which is connected at its load end (not shown) to the load and which shaft is rotated in the direction indicated in FIG. 1 against such load. Fixedly secured to shaft 2 is a bushing 3, which is provided at one end with a brake shoe disk 4 which includes a brake shoe element 5, adapted to frictionally engage a brake plate generally designated 6. A second brake plate generally designated 7 is disposed alongside of, but spaced from, brake plate 6. Brake plates 6, 7 are resiliently urged apart by springs 12, preferably three in number, equally spaced peripherally about shaft 2. Bolts 22 serve as retainers for springs 12 and, with nuts 23, limit the movement of plates 6, 7 away from each other.

A second brake disk 8 provided with brake shoe element 9 cooperates with the outer side of brake plate 7 when the brake is energized by the load. Said brake disk 8 is secured to a camming member generally designated 10.

As seen in FIGS. 1, 9 the brake plates 6, 7 are supported from the housing 1 by means of a pair of studs 13 which are received within outwardly opening recesses 14 in said plates. Said studs 13 are fixedly secured at their inner ends to housing 1 and serve to prevent rotation of brake plates 6, 7 and at the same time permit movement of said plates toward and away from each other.

The camming member 10 cooperates with another camming member generally designated 15, which is fixedly secured to bushing 3 and therefore moves with shaft 2.

Aligned with and spaced apart from shaft 2 is a pulley 16, which may be driven from a source of power (not shown) and may include a driving element for this purpose, such as a timing belt 17.

As best seen in FIG. 6. a driving member generally designated 18 is fixedly secured to the pulley 16 and is provided with a pair of inner bumpers 19 for driving the lugs 26 on camming member 15 in a counterclockwise direction as seen in FIG. 6 to hoist the load. At the same time lugs 25 on floating camming member 10 are aligned raidally with the lugs 26 on camming member 15 thereby preventing any axial force from being exerted by said camming members. When shaft 2 is driven in a clockwise direction as seen in FIG. 6, a pair of outer bumpers 20 on driving member 18 drive lugs 25 on camming member 10 clockwise thereby releasing shaft 2 allowing the load to lower.

Figure 2:
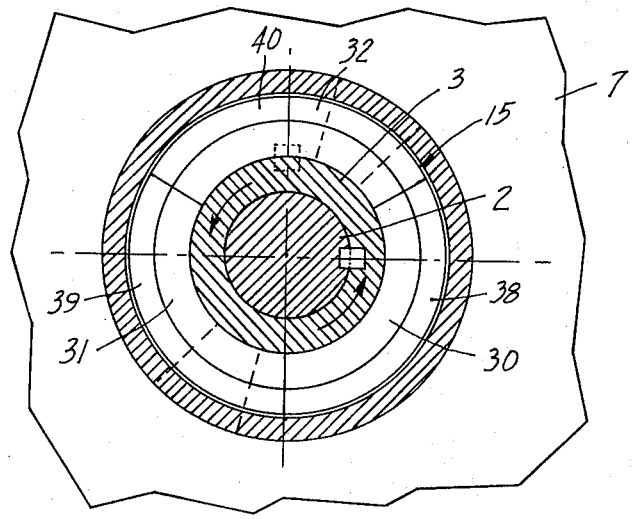
FIG. 2 is a transverse sectional view through the shaft and the associated cam members and taken in a plane indicated by line 2—2 of FIG. 1.
Figure 3:
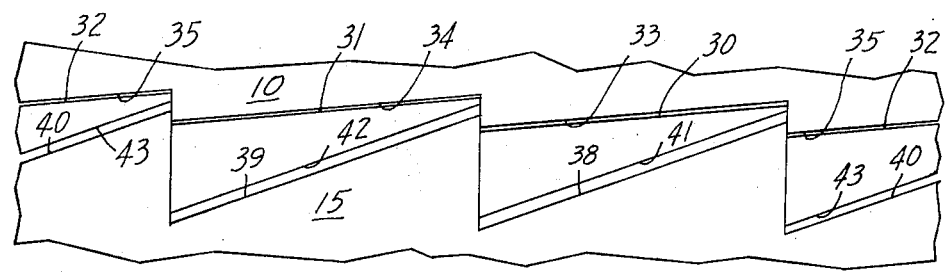
FIG. 3 is a schematic of a development of the camming surfaces showing how the cam members engage one pair of camming surfaces at light loads and another pair of camming surfaces at a heavier load.
Figure 11A:
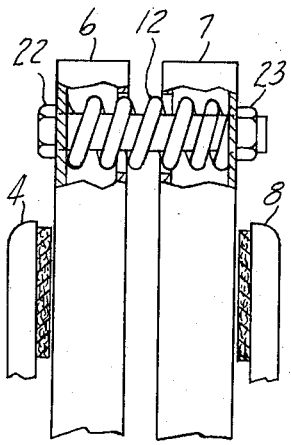
Figure 11B:
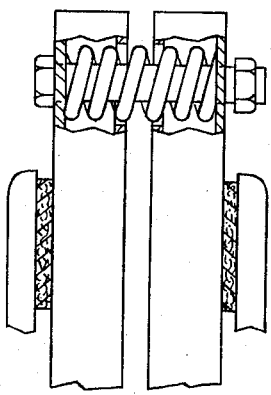
Figure 11C:
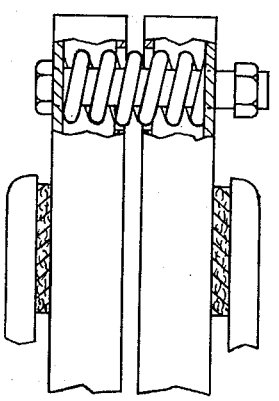
Figure 11D:
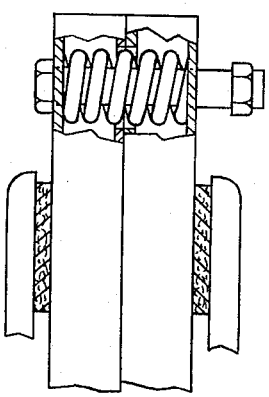
Figure 12A:
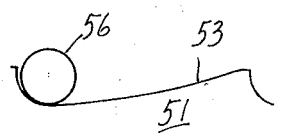
Figure 12B:

As best seen in FIGS. 1 and 2, the camming member 15 is provided with three axially directed camming surfaces 30, 31 and 32, which, as developed, are straight lines as indicated in schematic FIG. 3. These surfaces 30, 31, 32, extend around the inner portion of cam member 15, adjacent bushing 3 and, when camming members 10, 15 are in the driving position shown in FIG. 6, the camming surfaces 30, 31 and 32 are slightly spaced apart axially from complementarily formed surfaces 33, 34, 35, formed on cam member 10 thereby exerting no axial force.

When the parts are in the position shown in FIG. 6 with the lugs 25 in radial alignment with lugs 26, the above noted camming surfaces are slightly spaced apart to provide clearance as indicated in FIGS. 1, 3 thereby exerting no axial force. However, if the power to shaft 2 is removed, lugs 26 rotate with camming member 15 in a clockwise direction (FIG. 6) under the urgency of the load so that the above described camming surfaces on cam members 10, 15 engage each other and so that cam member 15, fixed to bushing 3, urges cam member 10 axially upwardly of shaft 2 as seen in FIG. 1. The result is that the brake shoe element 9 of brake disk 8 engages the adjacent surface of brake plate 7. At this point, it will be noted that the amount of relative rotation between cam members 10, 15 will increase with the torque imparted to cam member 15 from the load. In other words, a very light load would cause very little relative rotation so that a corresponding small amount of braking force is applied by brake element 9. On the other hand, if the load is greater, additional relative rotation takes place as the cooperating camming surfaces urge the cam member 10 axially so as to apply a greater braking force through the brake shoe element 9.

Radially outwardly of the camming surfaces 30, 31, 32, on cam member 15, are another set of camming surfaces 38, 39, 40, which, as developed, are also straight, but preferably at a considerably greater angle to a plane perpendicular to the axis of shaft 2 than the above mentioned camming surfaces 30, 31, 32. For example, if the inner camming surfaces are at an angle of about 6°, the outer camming surfaces are preferably at an angle of about 20°. Cooperating with outer camming surfaces 38, 39, 40 are complementarily formed camming surfaces 41, 42, 43 formed on cam member 10. As best seen in schematic FIG. 3, as cam member 15 moves to the left, corresponding to counter clockwise rotation of cam member 15 as seen in FIG. 2, the inner camming surfaces engage first, since they are closer together and after a predetermined amount of relative rotation between camming members 10, 15, the outer camming surfaces then engage and the inner camming surfaces disengage. The result of this is that under relatively light loads the inner camming surfaces of lesser slope engage to effect the desired amount of braking force to hold the load. However, if the load is greater than a predetermined amount, then continued relative rotation between cam members 10, 15 takes place, so that the outer camming surfaces of greater slope take over and thus apply a proportionately lesser amount of axial force for the greater amount of applied torque caused by an increase in the load. This results in easier and smoother release when the load is being lowered.

The important result of the above described structure is that the inner camming surfaces of lesser slope permit a light load to be held since a greater mechanical advantage is involved. At the same time, the outer camming surfaces permit a relatively heavy load to be held, which, if resisted by camming surfaces of small slope, would result in such a high frictional resistance due to the wedging action of the camming surfaces that it would be difficult to release the camming surfaces when it is desired to lower the load. By the structure described above, a relatively light torque in the reverse direction of shaft 2 will actuate the camming surfaces permitting the load to be held. However, when the outer camming surfaces of greater slope are in engagement, the wedging action is reduced so that the amount of frictional resistance to be overcome when cam 10 is reversed to lower the load is not so great as to prevent such lowering to be accomplished easily and smoothly.

A modification of the above described structure is shown in FIGS. 4, 5 representing the preferred form of the invention. In this case, the brake disk 8 is provided with the camming member generally designated 50, while there is fixedly secured to the bushing 3 a camming member generally designated 51. In general, with relation to the surrounding structure, cam member 50 is analogous to the above described cam member 10, while cam member 51 is analogous to member 15. Elements in FIG. 4 identical to corresponding elements in FIG. 1 are given the same numbers; for example, driving member 18 and lugs 25, 26.

In the structure of FIG. 4, cam member 51 is provided with three axially directed camming surfaces 53, 54, 55 as best seen in FIG. 5. Said camming surfaces are identical and camming surface 53 is shown in its developed form in FIG. 10.

Cam 50 is provided with three rollers 56, 57, 58, rotatably supported on shafts 59. Each of said rollers is in rolling engagement with its corresponding cam surface as best seen in FIG. 4 and when cam members 50, 51 are being driven in the hoisting direction by driving element 18, roller 56 is at the left hand end of camming surface 53 as seen in FIG. 10. It will be noted from FIG. 10 that camming surfaces 53, 54, 55 are not straight in their developed form, but rather increase in slope as the relative rotation between cam member 51 and cam member 52 increases.

Exact plotting of the curve of the camming surfaces 53, 54, 55 may be carried out with the characteristics in mind of the springs which urge the brake plates apart. The springs of the FIG. 4 structure will be referred to later on.

In conjunction with the use of the devices shown in FIGS. 1 and 5, it is preferably to form brake plates 6, 7 as seen in FIG. 4 so that each plate is relatively thick and hollow, being formed with thin walls to enhance heat dissipation. However, the actual construction of said brake plates is not critical. At any rate, each comprises an outwardly directed side for engaging the braking elements 5, 9.

The operation of the brake is shown schematically in FIGS. 11A – 14A from which it will be noted that when the load is being driven upwardly, the brake disks 4, 8 are out of engagement relative to the brake plates 6, 7. In such a case the camming members of FIG. 13A are in a position such that the camming surfaces 31, 34 are slightly spaced apart to provide clearance. In the FIG. 12A embodiment, the follower rollers are at the flat part of curve 53 so that no axial movement of floating cam member 50 results.

Figure 13A:
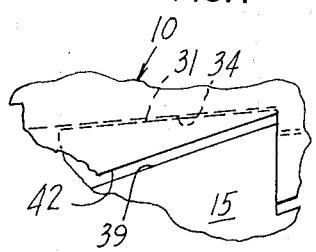
Figure 13B:
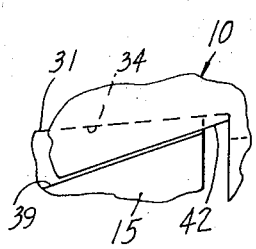

When the power is removed and a light load is impressed on the camming members, the camming surfaces 31, 34 of FIG. 13B are engaged and the plates 6, 7 are compressed slightly by the brake disks 4, 8. In this case it will be noted that the camming surfaces 39, 42 of greater slope are out of engagement. In the FIG. 12B structure, with an equivalent light load involved, the rollers have moved slightly along the length of the camming surfaces at a relatively low cam angle so as to result in the slight axial movement required to hold the load.

When the load impressed on the brake approaches a maximum rated load, the camming surfaces 39, 42 move into engagement in the FIG. 13C embodiment and the surfaces 31, 34 of smaller slope move out of engagement. Under the same corresponding load in the FIG. 13C embodiment, the follower rollers move a considerable distance along the length of the curved cam surface where the cam slope is quite high thereby compressing the plates 6, 7 a greater amount against the resiliency of the springs 12.

When an excessive or overload is applied to the camming surfaces (FIG. 11D), the plates engage each other, thereby preventing any additional relative movement between the camming members. The action in such an extreme case is analogous to the action of prior art load brakes of like nature.

It will be seen that the feature of the present invention by which the brake plates are resiliently urged away from each other permits moving from one cam angle to another impressing the optimum braking force required to hold the load and at the same time permitting easy release of the camming members when it is desired to drive the load downwardly.

The method by which plates 6, 7 are yieldably supported in the FIG. 4 embodiment for movement toward and away from each other will now be described in connection with a wear compensation device adapted to maintain said brake plates 6, 7 in their proper relative positions regardless of the amount of wear on the brake shoe elements 5, 9.

Between the brake plates 6 and housing 1 there is provided a cam ring generally designated as 66, which is connected to the adjacent brake plate 6 by means of three bolts 67, equally spaced around the cam ring 66. Said bolts 67 are passed through slots 68 in cam ring 66 as best seen in FIG. 9. As seen in the developed view of FIG. 7, bolts 67 also pass through shoes 69 which in turn are adapted to slide on camming surfaces 70, which are straight in their developed form and slightly inclined to a plane perpendicular to the axis of shaft 2.

Interposed circumferentially between the slots 68 are slots 73 which are similar to slots 68 and receive therethrough bolts 74. The heads of bolts 74 cooperate with shoes 75 which in turn are slidably received on cam surfaces 76.

Also mounted on each bolt 74 is an adjusting shoe 72 which is provided with a camming surface 77 cooperating with a camming surface 78 on cam ring 66. The inner end of adjusting shoe 72 is formed to provide a retainer for spring 79, which is interposed between the inner side of shoe 72 and the inner side of brake plate 7.

From FIG. 7 it will be apparent that spring 79 has the effect of urging the cam ring 66 inwardly away from said brake plate 7. At the same time, bolts 67 serve to urge the brake plate 6 away from brake plate 7 so that the actual position of brake plate 6 is determined by the position of shoe 72 in relation to cam surface 78.

The ring 66 is provided with preferably three radially inwardly projecting flanges 82, which are adapted to cooperate with a brake shoe element 83, carried by brake disk 4 (FIG. 4). The assembly is set up so that the brake shoe 83 is out of engagement with flange 82 when the device is initially assembled. However, as the brake shoes 5 wear, the elements 83 frictionally engage flanges 82 thereby uring cam ring 66 to move in the same direction as the brake disk 4. Upon such movement it will be apparent from the developed view in FIG. 7 that movement of the cam members 66 in the direction indicated causes the sliding shoe 69 to move upwardly along camming surface 70 on ring 66, thereby bringing the brake plate 6 closer to the ring 66. This same movement of cam ring 66 causes adjusting shoe 72 to move along cam surface 78 thereby tending to compress spring 79. However, due to the urgency of spring 79, the sliding shoe 75 cooperates with camming surface 76 which is at a greater degree of slope than camming surfaces 70, 78, thus causing brake plate 7 to move away from cam ring 66 the same distance as the adjusting shoe 72 causes the spring 79 to be compressed. The effect of movement of the ring 66 to the left under the urgency of friction element 87 on brake disk 4 is illustrated in FIG. 8 from which it will be seen that upon the load being driven in an upward direction, the brake plates 6, 7 move apart to take up for wear in the brake disks but at the same time the compressive force in spring 79 remains the same so that the braking force impressed on the brake plates by the interaction of cam members 50, 51 always remains the same regardless of the amount of wear of the brake shoes 5, 9. This insures that a load of a certain amount will apply a predetermined braking force at all times regardless of the amount of wear involved.

As an additional safety precaution, the present invention provides a means for giving an audible signal when the amount of wear of the brake shoes exceeds a predetermined amount so that the operator will be warned to have the shoes replaced before damage results. This warning device comprises a finger 87 secured to brake plate 6 and extending axially toward brake disk 4. When the unit is assembled, the outer end of finger 87 is spaced from the brake disk 4 in registration with an annular row of serrations 88 in said disk 4. When the amount of wear of the brake shoes reaches a predetermined amount, the finger 87 engages the plate 4, and, by reason of the serrations 88, causes a loud audible noise warning the operator to discontinue use of the hoist as soon as possible.

In the structures of FIGS. 1 and 4 it will be noted that in each case a cam member (15, 51) secured to the shaft undergoes rotation relative to an associated cam member causing the latter to move axially so as to engage the brake. In the present specification and in the following claims, it will be understood that the axially movable cam members 10, 50 include a "follower" and the term follower contemplates any structural element whose axial movement is affected by the cam member driven by the load.

With respect to the structure of FIG. 4 and specifically the profile of the camming surface 53 shown in FIG. 10, it will be understood to those skilled in the art that the curve of camming surface 53 may be plotted so that for an increment of torque on the shaft 2 caused by the load, the springs that yieldably separate the brake plates 6, 7 will be compressed an amount such that the compression will be proportional to the axial force required to stop and hold the load.

With respect to FIGS. 11–14, from which a clear understanding of the operation of the invention can be gained, it will be understood that bolts 22 and nuts 23 serve as stops in the same manner as bolts 74, ring 66 and bolts 67 collectively serve as stops in the FIG. 4 embodiment. In other words, while hoisting, the bolts 22 and nuts 23 permit positioning of the brake plates so that brake disks 4, 8 are just out of engagement.

The foregoing disclosure has been limited to an application of the load brake wherein the shaft 2 is driven in one direction against the load. The invention also contemplates a hoist wherein the load may be driven in either direction in accordance with the teachings of my prior U.S. Pat. No. 3,536,169.

I claim:

1. In a brake structure that includes a pair of brake plates and further includes a pair of brake shoes adapted to engage the opposite outer faces of said plates,
   resilient means for urging said plates apart with a predetermined force when said brake is disengaged,
   a cam member,
   first camming means on said member for causing said plates to move apart a predetermined amount upon movement of said cam member a certain distance in one direction,
   second camming means on said member for restoring said resilient means to apply said predetermined force upon said movement of said cam member said certain distance,
   whereby said plates are moved apart to compensate for wear of said brake shoes while the force of said resilient means remains the same.

2. A brake structure according to claim 1 wherein said cam member is generally circular and supported by said plates, and a plurality of pairs of first and second camming means are provided on said cam member.

3. A brake structure according to claim 2 wherein one of said brake shoes is adapted to rotate said cam member about its axis as said brake shoes wear to effect said movement in said one direction.

4. A brake assembly comprising:
   a pair of nonrotatable brake members in side by side relation,
   a pair of rotatable brake members on the opposite outer sides of said nonrotatable members,
   means for urging said rotatable brake members against the opposite outer sides of said nonrotatable members for braking rotation of said rotatable members,
   resilient means interposed between said nonrotatale members for yieldably urging the latter apart at all times, and
   stop means engageable with said nonrotatable members for limiting movement of said nonorotatable members away from each other.

5. A brake assembly according to claim 4 wherein said resilient means comprises three compression springs arranged in a circular row around the axis of said rotatable members and equally spaced apart.

6. In a load brake that includes a nonrotatable brake plate having a braking surface, a rotatable driving member and a coaxial rotatable driven member operatively connected to a load for raising the latter,
   a rotatable floating member adapted to be driven by said driving member as the latter drives said driven member,
   said driven member being provided with cam means and said floating member provided with a follower to impart axial movement to said floating member upon relative rotary movement between said members,
   said driven member being adapted to rotate in a direction reverse from the direction of said driving member when the power input to said driving member is removed, whereby said driven member urges said follower axially,
   said floating member being provided with a brake shoe adapted to engage said braking surface upon such axial movement,
   said cam means including portions of camming surfaces at different degrees of angularity relative to a transverse plane perpendicular to the axis of said members,
   a first flat camming section of said camming surfaces being at a small angle to said plane, and
   a second flat camming section at a greater angle to said plane,
   said follower including a pair of surfaces complementarily formed relative to said sections whereby said first camming section moves said floating member axially when the load is small and said second camming section moves said floating member when the load is greater.

7. A load brake according to claim 6 wherein said first and second sections are spaced apart radially of said axis.

8. A load brake according to claim 7 wherein three pairs of first and second camming surfaces are provided equally spaced apart around said axis.

9. In a load brake that includes a nonrotatable brake plate having a braking surface, a rotatable driving member and a coaxial rotatable driven member operatively connected to a load for raising the latter,
   a rotatable floating member adapted to be driven by said driving member as the latter drives said driven member,
   said driven member being provided with cam means and said floating member provided with a follower to impart axial movement to said floating member upon relative rotary movement between said members,
   said driven member being adapted to rotate in a direction reverse from the direction of said driving member when the power input to said driving member is removed, whereby said driven member urges said follower axially,
   said floating member being provided with a brake shoe adapted to engage said braking surface upon such axial movement,
   said cam means including portions of camming surfaces at different degrees of angularity relative to a transverse plane perpendicular to the axis of said members, with said angularity increasing as said relative rotary movement increases.

10. A load brake according to claim 9 wherein said follower comprises a roller.

11. A load brake according to claim 10 wherein said cam means includes a curved surface engagable by said roller.

12. A load brake according to claim 11 wherein three pairs of cammed surfaces and cooperating rollers are provided equally spaced apart around said axis.

13. An assembly for use in a power drive for retarding or holding an overhauling load that tends to overrun the power input, said assembly comprising:
friction means for retarding or holding said load,
a pair of interengaging camming members adapted for relative circumferential and axial movement from a neutral position for engaging said friction means when said load tends to overhaul said drive,
one of said camming members having camming surfaces of different degrees of angularity relative to a transverse plane perpendicular to the axes of said members, with said angularity increasing as said relative circumferential movement increases from said neutral position.

14. An assembly according to claim 13 wherein a brake is provided that includes said friction means, said brake also including resilient means permitting sufficient axial movement of said camming members to allow said one camming member to be engaged at different points on said camming surface depending on the amount of said load.

15. A brake assembly according to claim 14 wherein said brake includes a pair of opposed brake plates and a pair of brake elements adapted to engage the opposite outer faces of said brake plates, said resilient means being interposed between said brake plates.

16. An assembly according to claim 15 wherein stop means is provided for limiting movement of said brake plates away from each other when said camming members are in said neutral position.

17. An assembly according to claim 16 wherein said brake elements are out of engagement with said brake plates when said stop means is holding said plates against movement away from each other and said camming members are in neutral position.

18. A brake assembly according to claim 13 wherein said camming members are provided with a plurality of pairs of flat interengaging camming surfaces, one of said pairs of surfaces being at a small angle to said plane and a second pair of surfaces being at a greater angle to said plane.

19. A brake assembly according to claim 13 wherein one of said camming members is provided with a roller and the other is provided with a curved camming surface.

20. A brake assembly according to claim 13 wherein said assembly includes a nonrotatable brake plate forming part of said friction means, a rotatable driving member, one of said camming members being driven by said driving member and operatively connected to the load, the other of said camming members also being driven by said driving member and being provided with a brake element for engaging said brake plate upon said circumferential and axial movement.

21. A brake assembly according to claim 20 wherein spring means is provided for yieldably urging said brake plate toward said brake element to permit said camming members to undergo different amounts of relative axial movement depending on the amount of the load.

22. A brake assembly according to claim 18 wherein said one pair of surfaces is radially spaced from said second pair.

23. A brake assembly according to claim 15 wherein a wear compensating ring is provided, said ring being formed with first camming means for causing said brake plates to move apart a predetermined amount upon a predetermined circumferential movement of said ring in one direction, second camming means on said ring for restoring said resilient means to apply said predetermined force upon said predetermined circumferential movement of said ring.

24. A brake assembly according to claim 23 wherein said wear compensating ring is supported by said plates and is adapted to be rotated by one of said brake elements as said brake wears to effect said circumferential movement.

25. An assembly according to claim 13 wherein said friction means includes a nonrotatable braking member and a rotatable braking member, an indicator element carried by one of said braking members and adapted to move axially relative to a surface on the other braking member when said friction means wears means on said surface of said other braking member cooperating with said indicator element to emit an audible signal.

26. An assembly according to claim 25 wherein said element comprises a finger carried by one of said braking members and having a free end extending axially toward said surface on the other braking member, said surface being formed with interruptions cooperating with said free end to produce said audible sound.

27. An assembly according to claim 19 wherein said other camming member is provided with a neutral surface parallel to said plane and adjacent said roller when said camming members are in said neutral position, said neutral surface being in continuation of said curved surface.

28. An assembly according to claim 13 wherein one of said camming members is provided with a follower and the other is provided with a curved camming surface.

29. A brake assembly according to claim 4 wherein said stop means includes a tension member extending between said nonrotatable members and connecting them together for movement as a unit.

* * * * *